United States Patent [19]

Scharrenbroich

[11] 4,102,626
[45] Jul. 25, 1978

[54] APPARATUS FOR MANIPULATING PARISONS IN BLOW MOLDING MACHINES

[75] Inventor: Helmut Scharrenbroich, Neunkirchen, Fed. Rep. of Germany

[73] Assignee: Voith-Fischer Kunststofftechnik GmbH & Co. KG, Lohmar, Fed. Rep. of Germany

[21] Appl. No.: 774,430

[22] Filed: Mar. 4, 1977

[30] Foreign Application Priority Data

Mar. 11, 1976 [DE] Fed. Rep. of Germany ....... 2610258
Apr. 3, 1976 [DE] Fed. Rep. of Germany ....... 2614451

[51] Int. Cl.² .............................................. B29D 23/03
[52] U.S. Cl. ................................................... 425/526
[58] Field of Search ............... 425/522, 526, 528, 537, 425/525, 454

[56] References Cited

U.S. PATENT DOCUMENTS

| 3,074,110 | 1/1963 | Mard et al. ..................... 425/528 X |
| 3,347,966 | 10/1967 | Seefluth ......................... 425/537 X |
| 3,964,856 | 6/1976 | Day .................................. 425/526 X |

FOREIGN PATENT DOCUMENTS

| 642,609 | 2/1964 | Belgium ............................... 425/537 |
| 1,546,187 | 10/1968 | France ............................. 425/526 X |

*Primary Examiner*—Richard B. Lazarus
*Attorney, Agent, or Firm*—Peter K. Kontler

[57] ABSTRACT

A tempering mold for parisons which are formed in a parison mold and are about to be introduced into a blow mold has a tubular section open at one end and a second section reciprocable in the other end of the tubular section. A parison which is carried by a blowing mandrel, which tapers in a direction toward the free end of the mandrel and whose smaller-diameter end is closed, is introduced into the tubular section by way of the open end so that its closed end engages and displaces the yieldably mounted second section before the conical surface of the parison comes into contact with the complementary internal surface of the tubular section. The latter is biased by helical springs so that it can yield to the parison by moving axially and/or by pivoting with respect to its support. At least one of the sections is heated and/or cooled by a fluid or in another suitable way to effect rapid and reproducible conditioning of successive parisons.

10 Claims, 2 Drawing Figures

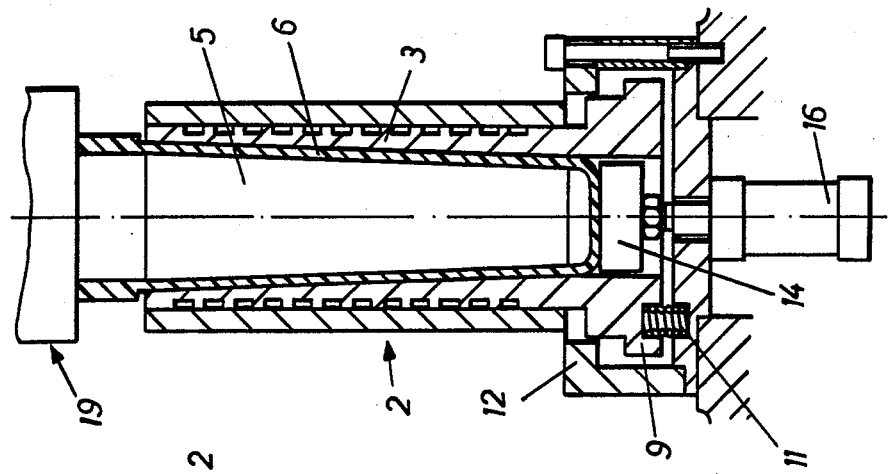
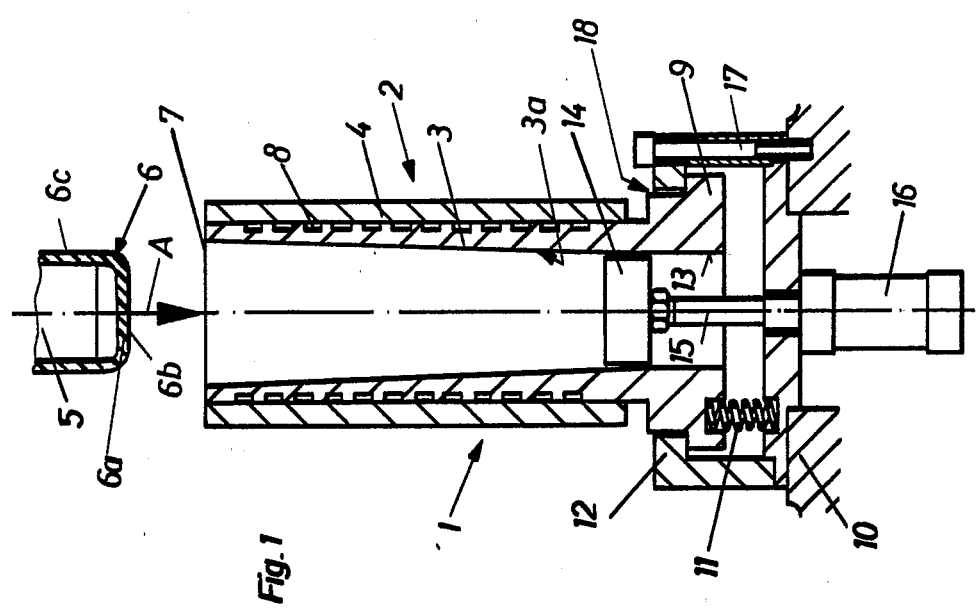

APPARATUS FOR MANIPULATING PARISONS IN BLOW MOLDING MACHINES

BACKGROUND OF THE INVENTION

The present invention relates to apparatus for manipulating parisons in blow molding machines, and more particularly to apparatus for manipulating parisons in machines for forming bottles or analogous hollow articles of plastic material by injection and subsequent expansion. Still more particularly, the invention relates to improvements in machines wherein parisons are formed in a parison mold, wherein the parisons are thereupon transported (preferably by a blowing mandrel) from the parison mold to an intermediate station at which the material of the parisons is conditioned prior to expansion, and wherein the parisons are finally introduced into a blow mold for conversion into bottles or the like.

It is known to form bottles or analogous hollow shaped articles in a machine wherein a metered quantity of plasticized material is injected into a parison mold at a first station while the parison mold confines a portion of a blowing tube or mandrel so that the resulting parison surrounds and adheres to the mandrel. An advantage of such mode of making parisons is that each parison has a closed end prior to introduction into the blow mold and also that the parisons can be produced with a high degree of reproducibility. The conversion of such parisons into bottles or the like takes place at a second station which is spaced apart from the first station. As a rule, the parisons are transferred to the second station by the blowing mandrel which admits a gaseous blowing medium into the parison therearound as soon as the blow mold at the second station is closed.

It is further known to condition the material of the parisons prior to introduction into the blow mold. Such conditioning normally involves cooling (tempering) of the parison so as to change the condition of the material of the parison from a thermoplastic to a thermoelastic state. The conditioning or tempering can take place in the parison mold, i.e., the parison is cooled in response to contact of its external surface with the surface surrounding the cavity of the parison mold and in response to simultaneous contact of its internal surface with the exterior of the blowing mandrel. The just described mode of conditioning parisons is quite satisfactory; however, the procedure is ill adapted to high production rates because the output of the machine is relatively low since the making of the next-following parison can begin only upon completion of conditioning of the preceding parison.

Attempts to increase the output of the just described blow molding machines wherein shaped articles are produced by injection and subsequent expansion include the provision of an intermediate or conditioning station at which successive parisons dwell during transport from the injection molding to the blowing station. As a rule, the conditioning operation involves a cooling of the parisons; however, and depending on the shape of the final product, it is often necessary or desirable to heat selected portions of the parison while the remaining portion or portions of the same parison undergo a cooling treatment. Reference may be had to German Offenlegungsschrift No. 2,400,951 which discloses a tempering mold disposed between the parison forming and blowing stations and having means for heating and/or cooling a parison therein. The mold is similar to conventional molds, i.e., it has two sections which can be moved between open and closed positions and, when closed, confine a parison which is closed at one end and surrounds a blowing mandrel. The latter serves as a means for transferring the parison from the parison mold into the mold at the conditioning station, for thereupon transferring the parison from the conditioning station into the blow mold, and for admitting a gaseous blowing medium into the conditioned parison at the blowing station. The tempering effect of the mold at the conditioning station is more pronounced if the mold is formed with a cavity bounded by a surface which closely follows and contacts the entire external surface of the parison on the blowing mandrel. This presents a number of serious problems which are attributable primarily to sensitivity of the parison prior to conditioning. The material of the parison is highly sensitive to mechanical stresses because it is still in a thermoplastic state and is likely to be deformed in response to contact with the mold at the conditioning station. Moreover, the configuration of the external surface of the parison on the mandrel which is moved from the parison-forming station to the conditioning station depends on certain other factors (i.e., not only on pronounced plasticity of the freshly injected material), especially on elastic memory of such material. Therefore, prior art proposals include the utilization of tempering molds having cavities which can receive a parison with a certain amount of clearance in order to avoid undesirable deformation of parisons during conditioning, particularly the development of flashes or webs in regions where the sections of the tempering mold abut against each other. This, coupled with automatic shrinkage of parisons during cooling, results in insufficient contact between the external surface of the parison and the internal surface of the closed tempering mold so that the conditioning of parisons in such molds takes up a relatively long interval of time. Furthermore, the length of intervals for adequate conditioning varies from parison to parison because the extent of surface-to-surface contact between the tempering mold and successive parisons varies within a wide range. Consequently, the conditioning action of the tempering mold upon successive parisons is not uniform, not only as considered in the longitudinal but also as considered in the circumferential direction of the parisons. This affects the quality of the ultimate products.

OBJECTS AND SUMMARY OF THE INVENTION

An object of the invention is to provide a novel and improved apparatus for manipulating parisons in blow molding machines of the type wherein bottles or analogous hollow articles are formed by injection and subsequent expansion and wherein the parisons are subjected to a conditioning treatment prior to introduction into the blow mold.

Another object of the invention is to provide a blow molding machine which embodies the improved apparatus.

A further object of the invention is to provide a novel and improved tempering mold for parisons which are about to be expanded in a blow mold.

An additional object of the invention is to provide a tempering mold which can insure rapid and highly reproducible conditioning of successive parisons and does not, or is unlikely to, deform the parisons in the course of or preparatory to the conditioning step.

Still another object of the invention is to provide a tempering mold which can be installed in existing blow molding machines as a superior substitute for conventional tempering molds.

The invention is embodied in a machine for the conversion of parisons into bottles or other types of hollow shaped articles, particularly in a machine for forming shaped articles by injection and subsequent expansion with a gaseous blowing medium wherein parisons (preferably of the type having a closed end and a conical external surface tapering in a direction toward the closed end) are transported from a parison-forming station to a blowing station by way of a conditioning station. The machine further comprises a novel tempering mold which is installed at the conditioning station and has a tubular section with an open end for introduction of successive parisons, and means for yieldably supporting the section so as to enable the section to yield by moving substantially axially in response to introduction of a parison by way of the open end. The machine still further comprises means (preferably a blowing mandrel) for introducing parisons into and for removing conditioned parisons from the tubular section. The internal surface of the tubular section is preferably complementary to the external surfaces of the parisons, i.e., such internal surface preferably tapers in a direction away from the open end of the tubular section. The supporting means may engage the section in the region of the second end of such section, and the construction of the section and supporting means is preferably such that the section can move axially as well as that the supporting means enables or allows the section to swivel, within limits, with respect to the supporting means during introduction of a parison.

The improved tempering mold may further comprise a second section or bottom member which is reciprocable in the second end of the tubular section, and means (e.g., a dashpot) for yieldably maintaining the second section in the path of movement of the closed end of a parison which is introduced into the tubular section so that the closed end of the parison engages and displaces the second section before the conical external surface of the parison engages the complementary conical internal surface of the tubular section. At least one section of the tempering mold may be provided with cooling channels or other suitable means for maintaining the temperature of the respective section within a predetermined range.

The novel features which are considered as characteristic of the invention are set forth in particular in the appended claims. The improved tempering mold itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a tempering mold which embodies the invention, further showing a portion of a parison and a portion of the blowing mandrel which transports parisons to the conditioning station; and FIG. 2 shows the structure of FIG. 1, with the parison fully received in the interior of the tempering mold.

DESCRIPTION OF THE PREFERRED EMBODIMENTS

The drawing shows a tempering mold 1 which is installed at a conditioning station intermediate a parison mold (not shown) and a blow mold (not shown). The tempering mold 1 comprises a tubular section 2 including a one-piece inner shell 3, a one-piece or composite outer shell 4 which surrounds the inner shell and a continuous helical channel or passage 8 which is machined into the periphery of the inner shell 3 and serves for circulation of a fluid conditioning or heat exchange medium. The upper end of the tubular section 2 is open, as at 7, and the configuration of the circumferentially complete conical internal surface 3a of the inner shell 3 conforms to configuration of the external surface 6c of a tubular parison 6 on a downwardly tapering blowing mandrel 5. The mandrel 5 constitutes a means for introducing parisons 6 into and for removing conditioned parisons from the mold 1. The means for transporting the mandrel 5 is shown at 19.

The other end of the inner shell 3 is also open, as at 13, and is provided with an external flange 9 which is biased against an annular stop 12 by several helical springs 11 (only one shown). The stop 12 is adjustably secured to a stationary base 10 by one or more fasteners 17. The upper and lower end convolutions of the springs 11 respectively extend into shallow recesses in the underside of the flange 9 and in the upper side of the base 10. The parts 10-12 and 17 together constitute a means for yieldably supporting the tubular section 2 so that the latter can yield by moving substantially axially (against the opposition of resilient elements 11) in response to introduction of a parison 6 into the inner shell 3.

The mold 1 further comprises a second section or bottom member 14 which resembles a plunger and is reciprocable in the open end 13 of the inner shell 3. The opening at the end 13 is preferably bounded by a cylindrical surface whose diameter slightly exceeds the diameter of the bottom member 14. The bottom member 14 is mounted on a shank 15 which constitutes the piston rod of a dashpot 16 secured to the base 10. The dashpot 16 can be replaced by one or more springs or other suitable means for yieldably urging the bottom member 14 to the upper end position shown in FIG. 1. Analogously, the helical springs 11 constitute but one form of means which can be used for yieldably urging the flange 9 into abutment with the stop 12. The mounting of the flange 9 in the enclosure including the base 10 and stop 12 is preferably such that the section 2 is free to move axially as well as to swivel with respect to the stop 12; this is denoted by the clearance 18 which is provided between the internal surface of the stop 12 and the adjacent surface of the flange 9. It can be said that the section 2 is free to "float" with respect to the supporting means 10-12, 17 and that the section 14 is free to float with respect to the section 2 as well as relative to the supporting means.

When the mandrel 5 is caused to enter the inner shell 3 by way of the open end 7 of the tubular section 2 (see FIG. 2), the exterior 6b of the closed end 6a of the parison 6 on the mandrel 5 moves toward and depresses the bottom member 14 against the opposition of the dashpot 16. The bias of the dashpot 16 (i.e., the resistance of the bottom member 14 against movement from the upper end position of FIG. 1) is preferably adjustable, e.g., by changing the pressure of a preferably gaseous fluid in the dashpot or by changing the initial stress of a spring which urges the shank 15 upwardly.

As the mandrel 5 continues to penetrate into the tubular section 2 (see the arrow A in FIG. 1), the conical external surface 6c of the major portion of the parison 6 engages the internal surface 3a of the inner shell 3 and, during the final stage of introduction of the mandrel 5, the parison 6 causes at least some axial displacement of the tubular section 2 against the opposition of the springs 11; such axial movement of the section can take place simultaneously with a more or less pronounced tilting of the section 2 relative to the stop 12. Tilting of the section 2 is possible due to provision of the aforementioned clearance 18 between the flange 9 and stop 12 as well as due to the fact that the diameter of the bottom member 14 is preferably less than the inner diameter of the opening at the end 13 of the inner shell 3. Of course, it is also possible to use a bottom member 14 which is snugly received in the open end 13 and to provide a spherical or other suitable universal joint between the base 10 and the housing of the dashpot 16 so that the latter can participate in pivotal movements of the tubular section 2 relative to the stop 12.

At least some axial displacement of the flange 9 away from the stop 12 (see FIG. 2) is desirable and advantageous because this insures that the springs 11 maintain the internal surface 3a of the shell 3 in highly satisfactory (large-area) contact with the tapering external surface 6c of the parison 6 on the blowing mandrel 5. Therefore, the conditioning of parisons in the mold 1 can be carried out with a high degree of reproducibility and requires surprisingly short intervals of time. The means for circulating a heat exchange medium in the helical channel 8 is of conventional design and is not shown in the drawing. It is clear that the structure of FIGS. 1 and 2 can be provided with other or additional means for maintaining the temperature of selected portions of or the entire section 2 and/or 14 within a given range, or for heating and cooling selected portions of the section 2 and/or 14.

The feature that the parison-contacting sections 2 and 14 of the mold 1 actually float on resilient means 11 and 16 insures a predictable conditioning of successive parisons 6 without any or with negligible mechanical stressing. This will be readily appreciated since a parison which enters the interior of the inner shell 3 can displace the bottom member 14 and/or the inner shell whereby the sections 2 and 14 automatically assume positions in which the parison is in maximum-area contact therewith. Furthermore, the size of the area of contact between the sections 2, 14 on the one hand and successive parisons 6 on the other hand varies very little or not at all so that identical heating and/or cooling of successive parisons insures identical conditioning of their material. This, in turn renders it possible to convert successive parisons into expanded shaped articles of identical appearance, strength and/or other characteristics.

The improved apparatus is susceptible of many modifications without departing from the spirit of the invention. For example, the means for supporting the section 2 in such a way that this section can yield by moving substantially axially in response to introduction of a parison can engage the section 2 midway between the open ends 7 and 13, in the region of the upper end 7, or at two or more locations which are spaced apart from each other, as considered in the direction indicated by arrow A. Furthermore, the mold of FIGS. 1 and 2 can be mounted upside down, i.e., the mandrel 5 can be mounted on the transporting mechanism 19 in such a way that it moves upwardly during introduction of a parison into the mold 1. All that is necessary is to insure that the mandrel 5 is coaxial or substantially coaxial with the section 2 during introduction of a freshly formed parison into the shell 3 (while the flange 9 abuts against the stop 12); this is desirable and advantageous because the major part of the external surface of the parison 6 then engages the internal surface of the shell 3 only during the last stage of introduction, i.e., when the exterior 6b of the closed end 6a already engages the adjacent surface of the section 14. The bias of the springs 11 and dashpot 16 can be readily selected in such a way that the resistance which the sections 2 and 14 offer to displacement by the parisons 6 compensates for eventual minor differences between the contours of successive parisons as well as for shrinkage of thermoplastic material during cooling by the fluid which is circulated in the channel 8 (and/or in the second section 14). The feature that the section 2 and/or 14 can be tilted by the parisons also contributes to automatic elimination of deviations between the contours of successively conditioned parisons.

Although it is possible to replace the illustrated tempering mold with an open-and-shut mold having sections which are movable toward and away from each other in a manner known from conventional parison molds, preform molds and blow molds, the illustrated mold (wherein the section 2 has an uninterrupted internal surface) is preferred because it insures that the exterior of the conditioned parison is free of webs, flashes and analogous material accumulations which develop in regions where the sections of conventional open-and-shut molds abut against each other. The outer shell 4 can be omitted if the channel 8 is located between the internal and external surfaces of the inner shell 3 of if the channel 8 is replaced with a coil.

As mentioned above, the second section 14 may also include or embody means (e.g., channels for a coolant) for changing the temperature of the adjacent portion (6a) of a parison 6 which is confined in the mold 1. The section 14 may further serve as a means for ejecting conditioned parisons from the inner shell 3 and/or for facilitating separation of the exterior of a conditioned parison from the internal surface of the shell 3 during retraction of the mandrel 5 preparatory to transport of conditioned parison into the blow mold.

A machine which includes a parison mold and at least one blow mold and wherein a blowing mandrel transports parisons from the preform mold to the location or locations where the parisons are converted into shaped articles by a gaseous blowing medium which is admitted by way of the mandrel is disclosed, for example, in U.S. Pat. No. 2,715,751 to Weber. With reference to the machine which is shown in FIG. 1 of this patent, the parison mold is located at the 6 o'clock position, the blow mold which receives conditioned parisons from the improved mold 1 can be located at the 9 o'clock position, and the improved mold 1 can be installed at the 7:30 o'clock position.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. In a machine conversion of parisons into bottles or other hollow shaped articles wherein parisons are formed in a first mold at a parison forming station and wherein the parisons are transported from said forming station into a blow mold at a blowing station via a conditioning station, the improvement comprising a tempering mold at said conditioning station, said tempering mold including a tubular section having an open end for introduction of successive parisons, means for supporting said section at said conditioning station with freedom of axial movement with respect to said supporting means, and means for biasing said section to a predetermined axial position with respect to said supporting means so as to enable said section to yield against the opposition of said biasing means by moving substantially axially from said predetermined position in response to introduction of a parison by way of said open end; and means for introducing parisons into said section.

2. A combination as defined in claim 1 for conditioning parisons of the type having a conical external surface, wherein said section of said tempering mold has an internal surface which is complementary to the external surfaces of the parisons and tapers in a direction away from said open end of said section.

3. A combination as defined in claim 2, wherein said section has a second end and said supporting means engages said section in the region of said second end thereof.

4. A combination as defined in claim 2, wherein said internal surface is an uninterrupted surface, as considered in the circumferential direction thereof.

5. A combination as defined in claim 4 for conditioning parisons of the type having a closed end at the smaller-diameter end of said conical external surface, wherein said section has an open second end and said tempering mold further comprises a second section reciprocably received in said second end of said first mentioned section and means for yieldably maintaining said second section in the path of movement of the closed end of a parison which is introduced into said first mentioned section.

6. A combination as defined in claim 5, further comprising means for maintaining the temperature of at least one of said sections within a predetermined range.

7. A combination as defined in claim 2, wherein said supporting means includes means for confining said section to axial and pivotal movement relative to said supporting means.

8. A combination as defined in claim 7, wherein said section has a second end including an external flange and said supporting means includes a base adjacent said second end said biasing means comprising resilient means reacting against said base and bearing against said section and said supporting means further including stop means located in the path of movement of said flange under the bias of said resilient means, said flange and said stop means defining a clearance which enables said section to swivel relative to said stop means and said base.

9. A combination as defined in claim 1, wherein said section includes an inner shell and an outer shell surrounding said inner shell, said shells defining a channel for circulation of a heat exchange medium.

10. A combination as defined in claim 1, wherein said introducing means includes a blowing mandrel.

* * * * *